United States Patent
Duffy et al.

(10) Patent No.: US 6,983,526 B2
(45) Date of Patent: Jan. 10, 2006

(54) COLD FORMED LATCH WIRE

(75) Inventors: Michael J. Duffy, Midland (CA); Donald M. Austin, Perkinsfield (CA); David J. Smallwood, Victoria Harbour (CA)

(73) Assignee: M & C Corporation, Warren, MI (US)

( * ) Notice: Subject to any disclaimer, the term of this patent is extended or adjusted under 35 U.S.C. 154(b) by 0 days.

(21) Appl. No.: 10/602,437

(22) Filed: Jun. 24, 2003

(65) Prior Publication Data

US 2004/0261246 A1 Dec. 30, 2004

(51) Int. Cl.
*B23P 11/00* (2006.01)

(52) U.S. Cl. .......................... 29/514; 29/509; 29/512; 24/265 CD; 297/256.16; 248/503.1

(58) Field of Classification Search ................ 29/714, 29/897, 897.2, 896.7, 897.34, 509, 512; 297/256.16, 297/250.1, 253; 24/265 CD; 224/248, 275; 248/503.1; 280/801.1
See application file for complete search history.

(56) References Cited

U.S. PATENT DOCUMENTS

| | | | |
|---|---|---|---|
| 1,647,992 A | | 11/1927 | Hartman |
| 1,690,408 A | | 11/1928 | Hasenflue |
| 2,583,806 A | | 1/1952 | Batzle |
| 3,705,738 A | | 12/1972 | Yoshimura |
| 3,912,315 A | | 10/1975 | Yamananaka |
| 4,838,513 A | * | 6/1989 | Kondo .................. 248/503.1 |
| 4,896,908 A | | 1/1990 | Kleefeldt |
| D308,627 S | | 6/1990 | Guffey |
| 4,981,313 A | | 1/1991 | Makamura |
| 5,215,342 A | | 6/1993 | Yuge et al. |
| 5,487,588 A | * | 1/1996 | Burleigh et al. ............ 297/253 |
| 5,524,965 A | * | 6/1996 | Barley .................. 297/256.16 |
| 5,729,951 A | | 3/1998 | Frohlich |
| 5,941,600 A | | 8/1999 | Mar et al. |
| 5,975,611 A | * | 11/1999 | Hoshihara et al. ........ 296/65.03 |
| 6,000,737 A | | 12/1999 | Yiu |
| 6,108,894 A | | 8/2000 | Mizuki et al. |
| 6,155,618 A | | 12/2000 | Ichinose |
| 6,193,310 B1 | * | 2/2001 | Batalaris et al. ............ 297/253 |
| 6,234,572 B1 | | 5/2001 | Shiino et al. |
| 6,276,754 B1 | | 8/2001 | Youssef-Agha et al. |
| 6,334,649 B1 | * | 1/2002 | Boegge et al. ........... 297/250.1 |
| 6,354,648 B1 | | 3/2002 | Allan et al. |
| 6,361,115 B1 | | 3/2002 | Aufrere et al. |
| 6,416,129 B1 | | 7/2002 | Hirota |
| 6,481,800 B2 | | 11/2002 | Duncan |
| 6,485,055 B1 | | 11/2002 | Swayne et al. |
| 6,499,786 B2 | | 12/2002 | Takahashi |
| 6,554,357 B2 | | 4/2003 | Moffa |
| 6,698,080 B2 | * | 3/2004 | Sawajiri et al. ............... 29/509 |
| 2002/0008416 A1 | | 1/2002 | Deptolla |
| 2002/0011505 A1 | | 1/2002 | Cole et al. |
| 2004/0080194 A1 | * | 4/2004 | Medvecky et al. ......... 297/253 |

FOREIGN PATENT DOCUMENTS

| | | |
|---|---|---|
| AU | 43390/79 | 5/1983 |
| EP | 0 694 436 A1 | 1/1996 |
| EP | 1 197 378 A1 | 4/2002 |
| EP | 1 336 530 A2 | 2/2003 |
| JP | 2001225681 | 8/2001 |
| JP | 2002211287 A | 7/2002 |
| WO | WO 03/070510 A | 8/2003 |

OTHER PUBLICATIONS

English Abstract corresponding to JP 2001225681 A1.
English Abstract corresponding to JP 2002211287 A.

* cited by examiner

*Primary Examiner*—Eric Compton
(74) *Attorney, Agent, or Firm*—Brooks Kushman P.C.

(57) ABSTRACT

A latch restraint and safety anchorage system for securing a child safety seat in an automotive vehicle behind the vehicle's seat is provided. One or more latch wires are generally mounted to a cross member of the anchorage system comprised of a pair of spatially separated legs joined at one end by a transverse latch bar. Each leg includes a tapered portion and an end portion. The end portion is exposed to allow the legs to be retained by the cross member.

10 Claims, 2 Drawing Sheets

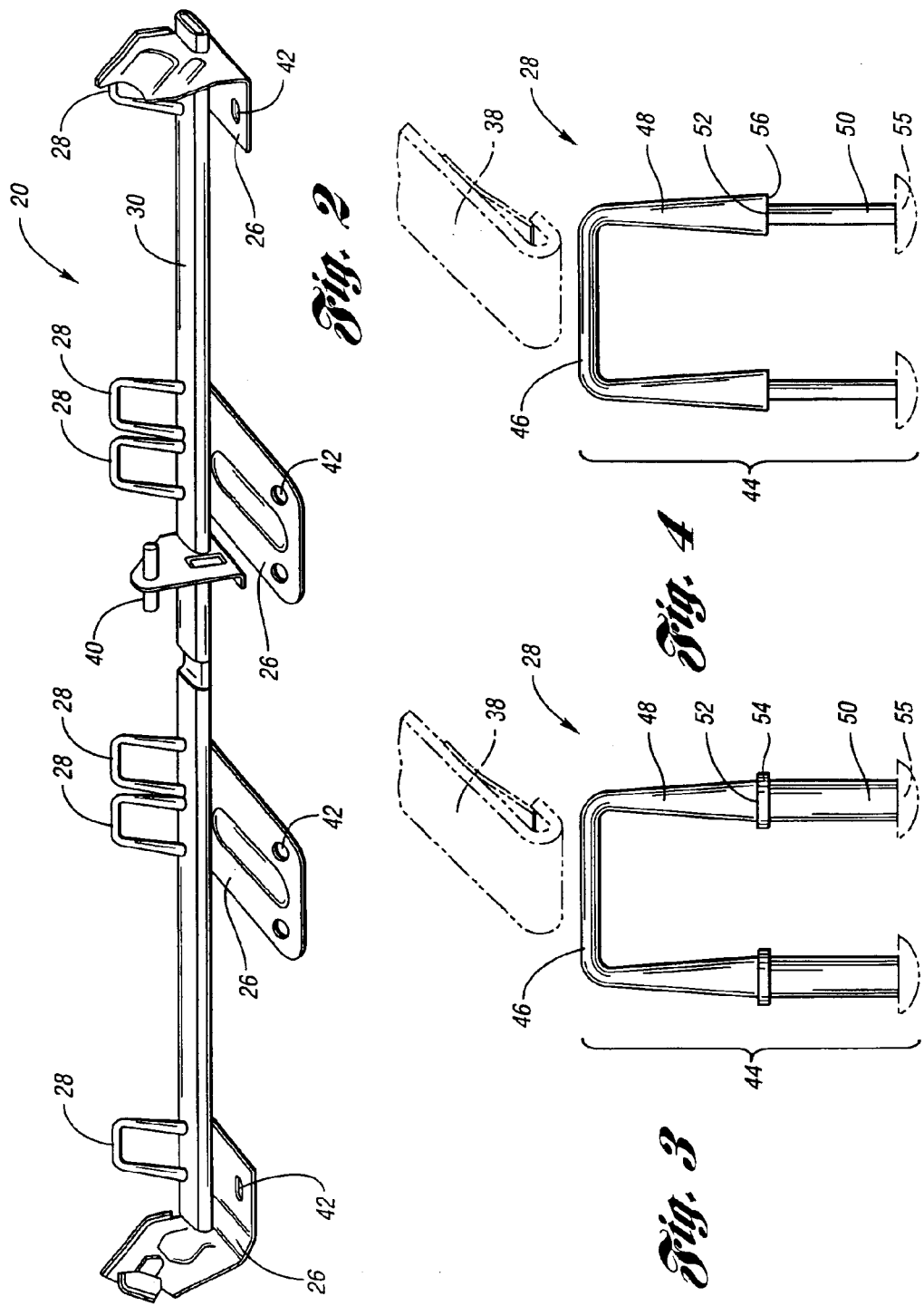

COLD FORMED LATCH WIRE

BACKGROUND OF THE INVENTION

1. Field of the Invention

The invention relates to child seat restraints for automotive vehicles and, in particular, to a latch restraint and anchorage system for securing the child restraint seat to the seat of a vehicle.

2. Background Art

Child safety seats have been required for many years by law for small children riding in automotive vehicles. In the past, child safety seats have been secured to a passenger seat using standard seatbelts provided for adult passengers that are anchored to one or more structural members of the vehicle. The seatbelts are normally threaded through apertures or slots provided in the child safety seat secure the child safety seat in position on the vehicle seat. The child safety seat mounting procedure is awkward and sometimes complex, which may result in improper securement of the child safety seat to the seat of the vehicle.

To overcome these problems, various regulations have been implemented requiring a standardization of the structure and methods for securing the child safety seat in an automotive vehicle. A recent Federal Motor Vehicle Safety Standard (FMVSS) adopted by the National Highway Traffic Safety Administration (NHTSA) requires vehicles be equipped with child seat restraint anchorage systems. The child restraint anchorage system outlined in this standard, FMVSS 225, requires, in part, that lower anchorages (i.e., latch wires) be rigidly attached to the vehicle, preferably one on each side of the child seat.

U.S. Pat. No. 6,276,754 issued to Youssef-Agha, et al. discloses a child safety seat having a pair of latch mechanisms which lockingly engage the latch wires to secure the child safety seat in position on the seat of the vehicle. The Youssef-Agha child safety seat includes latch wires that are welded to a cross member. However, welding distorts position and alignment of the latch wires. In other known anchorage systems for supporting and positioning the latch wires, bent legs of each latch wire are passed through enlarged holes provided in the cross member and then secured by a weld. The enlarged openings reduce rigidity relied upon for support, positioning and alignment, and make the assembly more susceptible to deformation due to welding heat.

Still other known anchorage systems for supporting and positioning the latch wires avoid the heat of a welding operation by providing a pair of collars on each latch wire leg. The legs are inserted into a cross member up to a first collar. A second collar is formed from the portion of the legs inserted into the cross member which protrude to the other side securing the latch wire to the cross member. This arrangement also avoids the need for an enlarged opening in the cross member to insert the legs through, since the legs in this instance can be straight. However, this arrangement does not resist deformation of the latch wire caused by use or abuse of the child safety seat as much as may be necessary.

Section S9.1 of FMVSS 225 requires the latch wire to include a transverse latch bar having approximately a 6 mm diameter. Child safety seat latch mechanisms are designed to engage the transverse latch bar of the latch wire. The standard 6 mm diameter allows child safety seat manufacturers to produce standardized latch mechanisms better equipped to safely secure a child. Further, the strength of the lower anchorages are regulated by Section S9.4 of FMVSS 225. The standard recites the maximum allowable deflection when certain forces are applied to the latch wire.

Typically, during manufacturing, each latch wire is formed from a constant diameter wire form, cut and bent into its preferred shape, which generally resembles the letter "U". The wire form is selected to ensure that the transverse latch bar portion of the latch wire maintains a constant 6 mm diameter. Thus, the remaining leg portions of the latch wire, which engage a cross member, are also approximately 6 mm in diameter. However, latch wires having such a constant diameter have difficulty meeting the requirements for maximum allowable deflection.

Previously known systems included a support bracket placed over the latch wire and secured to the cross member to reduce the cantilever effect of forces on the latch wire. The support bracket avoided misalignment and distortion of the latch wire in anchorage systems. However, this method is problematic in that it adds an additional component increasing both the cost and assembly required.

SUMMARY OF THE INVENTION

The present invention overcomes the above disadvantages by shaping the legs of the latch wire to provide greater strength and rigidity under bending loads. Therefore, one aspect of the present invention is directed to an apparatus and method for providing a restraint anchorage for a child restraint system. As described in greater detail below, the apparatus, according to the present invention, functions as a standardized restraint anchorage for connection with a child safety seat within a vehicle. The apparatus has the ability of strengthening the anchorage to resist forces due to the cantilever effect, while maintaining the criteria for the diameter at the striking surface of the anchorage without adding additional components and associated costs.

Another aspect of the present invention is to provide a latch wire and method for strengthening a child restraint anchorage system wherein the legs are tapered such that they are wider at one end than at the other.

Another aspect of the present invention is to provide a latch wire and method for strengthening a child restraint anchorage system that reinforces the latch wire without the aid of additional components.

Yet another aspect of the present invention is to provide a latch wire and method for strengthening a child restraint anchorage system that reinforces the latch wire with minimal manufacturing time and cost.

Still yet another aspect of the present invention is to provide a latch wire and method for strengthening a child restraint anchorage system which maintains the industry standard diameter across the retention zone of the latch wire.

A further aspect of the present invention is to provide a latch wire and method for strengthening a child restraint anchorage system wherein the forming process begins by reducing a portion of a wire form larger than the industry standard diameter, or by expanding a portion of a wire form equivalent to the industry standard diameter.

Accordingly, a restraint anchorage for a child safety seat for an automotive vehicle is provided. The restraint anchorage includes a cross member, at least two mounting brackets attached to the cross member, and at least one pair of latch wires. The brackets secure the cross member to the vehicle at a location behind a vehicle seat. Each latch wire is generally U-shaped having a pair of spatially separated legs joined at one end by a transverse latch bar. In operation, the child safety seat attaches to the transverse latch bar. Each leg includes a tapered portion and an end portion. The end portion is generally located at the end of the leg opposite the transverse latch bar. The tapered portion has a base and a continuously expanding diameter. The diameter of the tapered portion at its narrowest end is approximately equal to the diameter of the transverse latch bar. The diameter of the tapered portion then expands from its narrowest end towards the base wherein the diameter is some amount greater than the diameter of the transverse latch bar. The tapered portion provides the latch wire with reinforcement for greater strength and rigidity under bending or tensile loads.

In a certain embodiment, the end portion of each leg of the latch wires pass through holes provided in the cross member. The length of the legs protruding through holes provided in the cross member can be limited by a first collar or a shoulder disposed between the tapered portion and the end portion of each leg. Once each pair of latch wires is mounted to the cross member, a second collar engaging a surface of the cross member on a side opposite the first collar can be formed in order to secure the latch wire to the cross member to prevent it from being disengaged from the cross member by external forces. The first collar can be a collar having a diameter which extends radially outward a distance greater than the diameter of the end portion, or rather, the first collar can be a shoulder formed adjacent the base of the tapered portion which overhangs the narrower end portion.

Correspondingly, a method for manufacturing a restraint anchorage for a child safety seat for an automotive vehicle is provided. The method includes providing a cross member and at least two mounting brackets attached to the cross member. At least one pair of wire forms are also provided to form at least one pair of latch wires. Each wire form is then tapered in at least two locations, thereby forming two distinct tapered portions. The tapering is performed such that each tapered portion is separated by a constant diameter transverse latch bar portion. The U-shaped latch wire is then formed by providing a pair of spaced legs separated at one end by the transverse latch bar portion. The latch wire undergoes a bending process to form the pair of spaced legs. This is typically done in at least two spaced locations, one on either side of the transverse latch bar portion.

The wire form can be tapered by reducing the diameter of a middle portion of the at least one pair of wire forms, or rather, the wire form can be tapered by gradually expanding the diameter of selected locations of the wire form. Generally, the wire form can be reduced by a swaging process. Alternatively, the wire form can be expanded by a cold heading process. Furthermore, the method includes forming a first collar adjacent each tapered portion of the latch wire. Upon attaching the latch wire to the cross member, the first collar limits the amount of legs protruding through holes provided in the cross member. Finally, a second collar is formed on the latch wire on a side of the cross member opposite the first collar to secure the latch wire to the cross member.

These and other aspects and advantages will become more apparent from a reading of the detailed description in conjunction with the drawings.

BRIEF DESCRIPTION OF THE DRAWINGS

FIG. 2 is a perspective view of a child safety restraint anchorage including a plurality of latch wires;

FIG. 3 is a plan view of a latch wire according to a preferred aspect of the invention; and FIG. 4 is a plan view of a latch wire according to an alternate aspect of the invention.

DETAILED DESCRIPTION OF THE PREFERRED EMBODIMENT(S)

Figure 1:
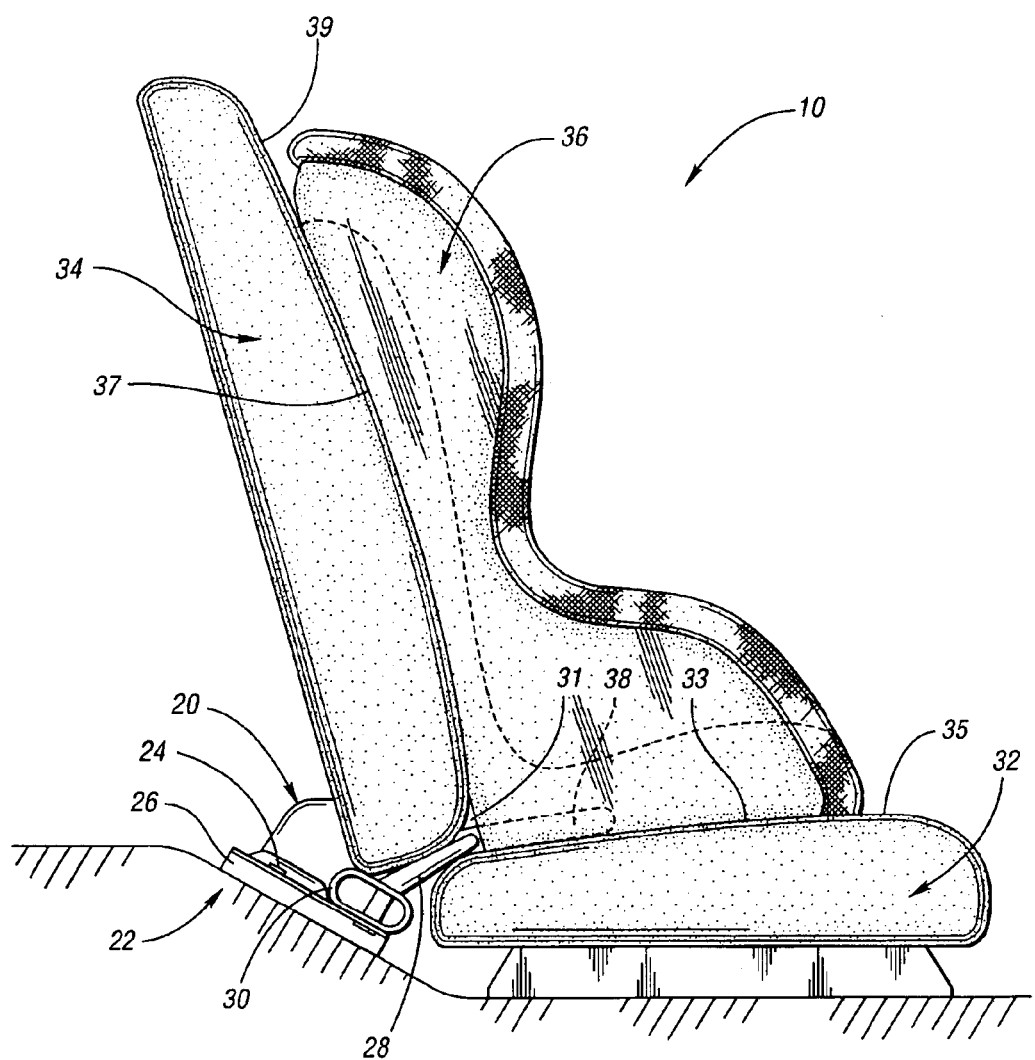
FIG. 1 is a side environmental view of a child safety seat secured to a child safety restraint anchorage system coupled to a passenger seat within a vehicle.

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Referring now to the Figures, an environmental view of the latch wire and restraint anchorage system of the present invention is illustrated in FIGS. 1 and 2. An anchorage 20 is fastened to the floor 22 of a vehicle 10 with bolts 24, which extend through anchorage brackets 26. The anchorage 20 includes a plurality of latch wires 28 attached to a cross member 30. The anchorage 20 and latch wires 28 are positioned such that the latch wires 28 extend through a channel 31 formed between a seat cushion 32 and a backrest 34 of the vehicle passenger seat.

A child safety seat 36 is disposed on the seat of the vehicle 10. In certain embodiments of the invention, a base 33 of the child safety seat 36 rests on an upper surface 35 of the seat cushion 32 while a back 37 of the child safety seat 36 rests against an outer surface 39 of the backrest 34. The child safety seat 36 includes an extendable latch mechanism 38, which is adapted to latch onto one or more of the plurality of latch wires 28. The latch mechanism 38 may be spring loaded to retract and lock when the latch mechanism 38 engages the latch wire 28 to pull the child safety seat 36 into place. Alternatively, latch mechanism 38 may be manually activated to engage and lock the child safety seat 36 in position.

The anchorage 20 for the child seat safety restraint system according to the present invention is shown in FIG. 2. Cross member 30 of anchorage 20 is supported by multiple mounting brackets 26 attached to a structural member of the vehicle (not shown), such as the floor behind the seat of the vehicle. It is understood that in many applications only two mounting brackets may be required. The cross member 30 may be formed of steel, structural plastic, or carbon fiber material as a solid bar, plates or a tubular member, as shown in FIGS. 1 and 2. A plurality of U-shaped latch wires 28 are attached to the cross member 30 at predetermined locations.

The illustrated embodiment shows three pairs or sets of latch wires 28 indicative of three possible mounting locations for a child safety seat 36. These three locations are the left side of the seat, the right side of the seat, and the center of the seat. It is understood that one or two sets of latch wires 28 may be attached to the cross member 30 if desired.

As shown in FIG. 1, the anchorage 20 is located behind the seat of the vehicle at a location such that the latch wires 28 extend forward in the channel 31 between the seat cushion 32 and the backrest 34 of the vehicle seat. The anchorage 20 may include pivots or other attachments, such as pivot 40, permitting a portion of the backrest 34 to be folded down to provide access into the trunk area from the passenger compartment of the vehicle. Alternatively, pivot 40 may allow for movement of a foldable armrest. The mounting brackets 26 each have one or more bolt holes 42 facilitating the bolting of the anchorage 20 to the vehicle.

Referring now to FIG. 3, a first aspect of the invention illustrating the latch wire 28 is shown. The latch wire 28 has a generally U-shaped configuration having a pair of spatially separated legs 44 joined at one end by an integral transverse latch bar 46. The latch bar 46 provides a continuous 6 mm diameter striking surface as required by the National Highway Traffic Safety Administration. The latch mechanism 38 of the child safety seat (not shown) latches onto the latch bar 46 securing the child safety seat to the vehicle.

Each leg 44 of the latch wire 28 includes a tapered portion 48 and an end portion 50. The tapered portion 48 subsumes a section of the leg 44 nearest the latch bar 46, while the end portion 50 subsumes the section of the leg 44 opposite the latch bar 46. It is understood that tapered for purposes of this invention means a section of the leg 44 that is wider at one end than at the other. The tapered portion 48 has a base 52 designating the area of the tapered portion having the largest diameter. The diameter of the tapered portion 48 gradually decreases from the base 52 as tapered portion 48 extends toward the latch bar 46. Ultimately, the tapered portion 48 achieves a minimum diameter approximately equal to that of the transverse latch bar 46. The tapered portion 48 may be conical in shape, as illustrated in FIGS. 3 and 4, or, alternatively, parabolic or some other similarly tapered shape.

The end portion 50 of leg 44 includes a generally continuous diameter extending from the base 52 towards the end of the leg 44 opposite that of the latch bar 46. In a particular embodiment shown in FIG. 3, the diameter of end portion 50 is sized approximately equal to the base 52. Each leg 44 of latch wire 28 may include a rigid first collar 54 which can be formed by cold heading or any other process known in the art. The first collar 54 may be disposed at the base 52 adjacent the tapered portion 48 and the end portion 50. First collar 54 is positioned for mating engagement with the cross member (not shown) upon the attachment of latch wire 28 to the cross member. Moreover, FIG. 3 illustrates an enlarged head forming a second collar 55 at the end of each leg 44. Second collar 55 secures the latch wire 28 to the cross member to prevent it from being disengaged from the cross member. Second collar 55 is shown in phantom as it is not a part of latch wire 28 until latch wire 28 is secured to the cross member. Moreover, depending on the method utilized for attaching latch wires 28 to the cross member, second collar 55 may be unnecessary.

A method for manufacturing the latch wire 28 in FIG. 3 is described below. It is understood that other methods exist for achieving the tapered design provided by this invention, and that this invention is not limited to the method detailed herein. A wire form having a desired diameter is cut to a particular length. The diameter of the wire form may be larger than the 6 mm industry standard, and is chosen to withstand the load-bearing forces applied to the latch wire 28 when in use. In order to maintain the industry standard 6 mm diameter at the retention zone of the latch wire 28, i.e. the striking surface which engages the latch mechanism 38, a portion of the wire form is reduced in diameter. Generally, the reducing step reduces the diameter of a middle portion of the wire form encompassing the transverse latch bar 46, down to the industry standard. The reduction is done gradually so as to form the tapered portion 48 on either side of the latch bar portion 46. The end portions 50 of legs 44 maintain their original diameter. The wire form can be reduced by any known processes in the art, such as swaging or machining, so long as the tapered portions 48 are formed on both ends of the latch bar portion 46.

If desired, collars 54 may be cold formed in a mechanical die press. The collars 54 may be formed adjacent the base 52 of the tapered portions 48, or further down onto the end portions 50. In certain embodiments shown, the collars 54 extend generally radially outward a distance greater than the thickest portion of the legs 44 to limit the amount the legs protrude through holes in the cross member 30 when the latch wire 28 is attached thereto. Each collar 54 may be shaped in accordance with a mating surface of the cross member 30. For example, collar 54 may provide a curved surface for mating engagement with a round cross member. Alternatively, collar 54 may provide a flat surface for mating engagement with a flat surface of the cross member 30.

Next, the wire form is bent to form the legs 44 of the latch wire 28 in such a way as to provide a constant industry standard diameter retention zone the entire length of latch bar 46. Moreover, the wire form can be bent to position the latch wire 28 into the channel 31 between the seat cushion 32 and backrest 34 when assembled in the vehicle. The wire form is typically bent in a series of operations as the wire form progresses through a transfer press system. However, it is fully contemplated that the wire form can be bent by other means. Moreover, it is understood that the bending operation can precede the reducing and/or collaring steps in the process.

Finally, once the latch wire 28 is formed, it is then attached to the cross member 30. Any known method in the art for attaching can be utilized, such as welding or orbital peening, or the like. The advantages of manufacturing the latch wire 28 include providing reinforcement, strength and rigidity to the latch wire 28 under bending and tensile loads, while maintaining the 6 mm industry standard diameter latch bar 46. The larger diameter wire form found in the tapered portions 48 and the end portions 50 provide the necessary structural reinforcement, while the reducing operation shapes the latch bar 46 to meet the industry criteria.

Referring now to FIG. 4, an alternate aspect of the latch wire 28 of the latch restraint and anchorage system of the present invention is illustrated. Similar elements retain the same reference numerals, whereas different elements are assigned different reference numerals. The latch wire 28 maintains all general features and advantages previously described. Here, latch wire 28 includes a pair of spatially separated legs 44 joined at one end by an integral transverse latch bar 46. The latch bar 46 provides the continuous 6 mm diameter striking surface standardized by the National Highway Traffic Safety Administration. The latch mechanism 38 of the child safety seat (not shown) latches onto the latch bar 46, securing the child safety seat to the vehicle.

Each leg 44 of the latch wire 28 includes a tapered portion 48 and an end portion 50. It is understood that tapered for purposes of this invention means a section of the leg 44 that is wider at one end than at the other. The tapered portion 48 has a base 52 designating the area of the tapered portion having the largest diameter. The tapered portion 48 expands from near the latch bar 46 wherein the diameter is equivalent to that of the latch bar 46 towards the base 52. The tapered portion 48 may be conical or parabolic in shape.

The end portion 50 has a generally continuous diameter extending from the base 52 towards the end of the leg 44 opposite that of the latch bar 46. In the particular embodiment shown in FIG. 4, the diameter of the end portion 50 is sized approximately equal to the 6 mm industry standard of latch bar 46. Moreover, a shoulder 56 may be formed on each leg 44 by the engagement of the end portion 50 to the base 52 using manufacturing methods described above. Shoulder 56 provides a surface for mating engagement with the cross member (not shown). As in FIG. 3, second collar 55 is illustrated in phantom to show that it may be formed after latch wire 28 is attached to the cross member to prevent the latch wire 28 from being disengaged from the cross member.

The method of manufacturing the latch wire illustrated in FIG. 4 varies from the method outlined for the latch wire in FIG. 3. For example, the continuous diameter wire form is selected to meet the 6 mm industry standard for the retention zone of the latch wire 28. The wire form is then cut to the desired length. Since the wire form is selected to meet the industry standard diameter, a reducing process is unnecessary. Rather, the tapered portions 48 are formed by an expanding process which gradually expands the diameter of the wire form in preselected locations from its original diameter to its end diameter represented by the base 52. Such an expansion process generates a continuous integral cone shape, as shown in FIG. 4. It is understood that a continuous integral paraboloid may also be formed by expanding the wire form.

The tapered portions 48 may be formed by a cold heading process wherein the wire form is sequentially driven into a mold cavity to expand the wire form. The number of steps required to obtain the desired shape of the tapered portion 48 may vary. Ultimately, tapering is achieved to provide one end of the tapered portion 48 having a diameter greater than that of the other end. It is to be understood that any known process in the art for expanding is fully within the scope of this invention. The end portions 50 maintain the industry standard diameter of the preselected wire form, and therefore are not expanded.

If desired, the wire form, once tapered, may undergo a collaring or shouldering process by which the shoulder 56 is formed from the intersection between the base 52 of the tapered portion 48 and the end portion 50. In a particular aspect of the invention, a smooth surface can be formed on the base 52 in a mechanical die press generating the shoulder 56. Shoulder 56 is shaped to correspond to a mating surface of the cross member 30. For example, shoulder 56 can be shaped to correspond to a round surface or a flat surface of the cross member 30.

Next, the wire form undergoes the bending operation similar to the process previously described above. The wire form is generally bent at or near the narrowest end of the tapered portion 48 forming the pair of spatially separated legs 44, thereby forming the latch wire 28. The wire form may undergo additional bending as necessary to position the latch wire 28 into the channel 31 between the seat cushion 32 and backrest 34. Again, it is understood that the bending operation could precede the expanding and/or collaring operation. Once the latch wire 28 is formed, it is attached to the cross member 30 to form the anchorage 20. The attachment is achieved by any known method for attaching in the art, such as welding or orbital peening, or the like.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of manufacturing a restraint anchorage for a child safety seat for an automotive vehicle, the method comprising:
   providing a cross member and at least two mounting brackets attached to the cross member;
   providing at least one pair of wire forms to form at least one pair of latch wires;
   forming a constant diameter transverse latch bar portion between spaced legs from each wire form; and
   tapering each wire form in at least two locations to generate at least two distinct elongated tapered portions separated by the transverse latch bar portion.

2. The method of claim 1 wherein said forming comprises bending the wire form.

3. The method of claim 2 wherein said forming comprises bending the wire form in at least two spaced locations.

4. The method of claim 1 wherein said tapering comprises reducing the diameter of a middle portion of the at least one pair of wire forms.

5. The method of claim 4 wherein said reducing is done by swaging.

6. The method of claim 1 wherein said tapering comprises gradually expanding the diameter of each tapered portion of the at least one pair of wire forms.

7. The method of claim 6 wherein said expanding is done by cold heading.

8. The method of claim 1 further comprising collaring to form a first collar adjacent each tapered portion.

9. The method of claim 8 further comprising attaching each pair of latch wires to the cross member by inserting end portions into holes provided in the cross member up to a point where each first collar engages a first surface of the cross member.

10. The method of claim 9 further comprising forming a second collar on each end portion engaging a second surface of the cross member on a side opposite the first collar to secure each pair of latch wires to the cross member.

* * * * *